3,455,734
PROCESS OF TREATING TEXTILES WITH POLYCONDENSATES CONTAINING AMIDE AND ESTER GROUPS
Gwilym Thomas Jones, James Albert Moyse, and Gerald Scott, Manchester, England, assignors to Imperial Chemical Industries Limited, London, England, a corporation of Great Britain
No Drawing. Filed Jan. 10, 1966, Ser. No. 519,427
Claims priority, application Great Britain, Jan. 12, 1965, 1,395/65; Mar. 31, 1965, 13,708/65
Int. Cl. B44d 1/22
U.S. Cl. 117—138.8
8 Claims

ABSTRACT OF THE DISCLOSURE

Condensation products of (1) an aliphatic dicarboxylic acid with (2) a mixture of (a) a hydroxypolyoxyalkylene compound and (b) an amine component selected from the class consisting of aliphatic and cycloaliphatic amino acids, the lactams derived from these amino acids, aliphatic and cycloaliphatic diamines, mixtures of these amino acids with diamines and mixtures of the lactams with the diamines. These products are useful in the treatment of textiles, for example, to improve hand and abrasion resistance.

---

This invention relates to polycondensates containing amide and ester groups and to their use in the treatment of shaped articles, particularly textile materials.

We have found that polycondensates are obtained by the condensation of aliphatic dicarboxylic acids with a mixture of a hydroxypolyoxyalkylene compound with either an aliphatic or cycloaliphatic amino acid or lactam or with an aliphatic or cycloaliphatic diamine or with both, and that such polycondensates are useful for the treatment of shaped articles in order to impart valuable properties such as, in the case of hydrophobic material, improved moisture absorbency and a reduction in the tendency to acquire charges of static electricity.

Thus the invention provides condensation products of an aliphatic dicarboxylic acid with a mixture of a hydroxy-polyoxyalkylene compound with either an aliphatic or cycloaliphatic amino acid or lactam or with an aliphatic or cycloaliphatic diamine or with both.

Instead of a single dicarboxylic acid, hydroxy-polyoxyalkylene compound, amino acid or lactam, or diamine mixtures of the said compounds may be used.

By an aliphatic dicarboxylic acid we mean in particular dicarboxylic acids of the formula:

$$HO_2C \cdot [CH_2]_n CO_2H$$

in which $n$ represents zero or a positive integer from 1 to 10. Adipic acid is particularly suitable.

By aliphatic amino acids or lactams we mean in particular ω-amino aliphatic carboxylic acids and the derived lactams. Particular compounds of this class may be represented by one of the formulae:

$$NH_2 \cdot [CH_2]_n CO_2H \quad \text{and} \quad \begin{bmatrix} [CH_2]_n \\ NH-CO \end{bmatrix}$$

in which $n$ is a positive integer from 3 to 11. Caprolactam is particularly suitable. Examples of cycloaliphatic amino acids include 4-aminocyclohexanecarboxylic acid and 4-aminocyclohexylacetic acid.

By a hydroxy-polyoxyalkylene compound we mean a compound containing at least one hydroxyl group and a plurality of divalent radicals of the formula —alkylene—O—

The alkylene groups preferably contain from two to four carbon atoms and particularly preferred are 1,2-ethylene and 1,2-propylene groups. The alkylene groups in any one compound may be the same or different. Such compounds include polyoxyalkylene glycols and especially polyoxyethylene glycols and polyoxypropylene glycols. Particularly suitable are those mixtures of polyoxyethylene glycols which have an average molecular weight of between 300 and 6000. Also suitable are condensates of alkylene oxides with compounds containing hydrogen atoms reactive with alkylene oxides. The alkylene oxide may be ethylene oxide, propylene oxide or butylene oxide, or mixtures of such alkylene oxides may be used. Particularly suitable are alkylene oxide condensates of the following types:

(1) Alkylene oxide condensates derived from glycols especially from those containing more than 4 carbon atoms, for example condensates of 1,6-hexanediol with ethylene or propylene oxide, (2) Alkylene oxide condensates derived from polyols, for example glycerol, trimethylolpropane, pentaerythritol, mannitol or sorbitol, (3) Alkylene oxide condensates derived from primary amines, for example, methylamine or from polyamines, (4) Alkylene oxide condensates derived from acid amides, (5) Alkylene oxide condensates derived from di- or poly-carboxylic acids, for example, succinic or adipic acids, (6) Alkylene oxide condensates derived from di- or polyhydric phenols, for example, diphenylolpropane, and (7) Polyoxyalkylene compounds containing one terminal hydroxyl group together with one primary amino group. Such compounds are described in U.S. patent specification No. 3,110,732 and include compounds of the formula $H_2N.(CH_2.CH_2O)_xH$ in which $x$ represents a positive integer.

The aliphatic or cycloaliphatic diamines which may be used as components in the condensates of the invention may be any aliphatic or cycloaliphatic diamines in which the amino groups are primary or secondary. Particularly preferred, however, are those aliphatic diamines having the formula:

$$NH_2 \cdot [CH_2]_n NH_2$$

in which $n$ represents a positive integer of from 2 to 12. Hexamethylene diamine is particularly suitable.

The condensates of the invention are random poly-condensates containing amide and ester groups. It is preferred that the amount of aliphatic dicarboxylic acid used in forming the condensate is the approximate stoichiometric equivalent of the sum of the amounts of hydroxypolyoxyalkylene compound and diamine used.

The amount of hydroxypolyoxyalkylene compound used may vary within wide limits. We prefer, however, that the weight of the hydroxypolyoxyalkylene compound used should form between 10% and 95% of the total weight of the reactants.

The condensates are conveniently prepared by mixing the components and heating them, for example at a temperature within the range 150° C. to 300° C. for from 30 minutes to 12 hours. It may be desirable to carry out the condensation in an atmosphere of an inert gas such as nitrogen. It may also be desirable to incorporate antioxidants or stabilisers in the reaction mixture prior to condensation. In some cases it is preferable to incorporate a solvent or flux such as o-phenylphenol in the reaction mixture. This may subsequently be removed by distillation under reduced pressure. It is frequently advantageous to carry out the final stages of the condensation at a reduced pressure. Instead of adding the diamine separately to the reaction mixture it may be added in the form of a salt with the dicarboxylic acid.

The condensates of the invention are usually solids, which may be brittle or of a rubbery nature depending on the proportions of the reactants used and on the degree of polymerisation of the condensate. Depending on the amount of hydroxypolyoxyalkylene compound used they show varying degrees of solubility in water, the solubility increasing with the proportion of alkyleneoxy groups in the molecule. Those compounds which are not soluble in water are readily dispersible in aqueous media.

We have also found that the condensates of the invention are useful for the treatment of shaped articles composed of either natural or synthetic polymeric material.

Natural polymeric material includes cellulosic material and proteinaceous material such as keratin. Synthetic polymeric material includes polyamides such as nylon, including polymers of caprolactam, polyesters such as polyethylene terephthalate, polymers and copolymers of acrylonitrile, cellulose esters such as cellulose triacetate and glass.

The shaped articles may be of any desired kind. They may be obtained from the polymeric material by any known shaping process, for example by casting, moulding or extrusion. The process of our invention is particularly applicable, however, to filaments, fibres and foils and films and especially to textile materials comprising such filaments or fibres. Textile materials include rovings, yarns, non-woven webs and woven and knitted fabrics as well as filaments and fibres. Natural polymeric material may already be in fibrous form, as for example cotton and wool fibres, or may be converted into fibrous form as for example in the conversion of natural cellulose into the cellulosic rayons. Synthetic polymeric material may be converted into fibrous form by wet or dry spinning operations as may be appropriate.

We have found that when shaped articles composed of natural or synthetic polymeric material are treated with the condensates of the invention that the properties of the said articles are improved. For example in the case of cellulosic textile materials there may be a modification in handle or an improvement in the abrasion resistance. Where cellulosic textiles are treated with a resin or other agent to impart crease recovery properties, concomitant treatment with a condensate of the invention may also modify the handle or improve the abrasion resistance of the resin-treated textiles.

The condensates of the invention are particularly suitable for the treatment of shaped articles, especially textile materials and films, composed of hydrophobic synthetic polymeric material.

It is well known that shaped articles made from hydrophobic polymeric material besides having a very limited capacity for absorbing moisture become electrified readily when subjected to friction. These properties are disadvantageous in that the electrified articles readily attract dirt and dust. Moreover film composed of hydrophobic polymeric material which has become electrified is difficult to handle in that it becomes attracted to and clings to other articles. Further, textile materials composed of hydrophobic polymeric material which are used for clothing, besides having the disadvantages of soiling readily, tend to be uncomfortable in wear owing to the limited capacity for absorbing moisture. Such materials include those composed of polyamides, polyesters, polymers and copolymers of acrylonitrile and cellulose triacetate.

Thus a further feature of our invention provides a process for the treatment of shaped articles composed of natural or synthetic polymeric material which comprises applying to the said articles a condensate of the invention.

A mixture of the said condensates may be used if desired.

The condensates of the invention are dispersible in water and may be soluble in water and it is convenient to apply them to the shaped articles from an aqueous medium. If desired, however, a solution or dispersion in an organic solvent or in a mixture of an organic solvent with water may be used. The solution or dispersion may be applied to the shaped article by any suitable method, for example by dipping, impregnation or spraying, or by application with a brush, furnishing roller or squeegee. The application conveniently takes place at the ordinary temperature but if desired may take place at a moderately elevated temperature for example at temperatures up to 50° C.

After application of the solution or dispersion the shaped article may be dried, if desired at the ordinary temperature, but conveniently at elevated temperatures up to about 120° C.

The amount of the condensation product of the invention applied to the shaped article may be varied within wide limits. In most cases, however, the amount applied lies within the range 0.1% to 5% of the weight of the shaped article.

In some cases it may be convenient to bake the shaped article after application of the condensation product so as to improve its fixation. For example the shaped article may be heated at a temperature within the range 120° C. to 220° C. for from 10 seconds to 30 minutes.

There may also advantageously be applied to the shaped article, in addition to the condensation product of the invention, a cross linking agent or a resin precondensate and if desired a catalyst, which will react with the condensation product and assist in fixing the latter on the shaped article, for example by reducing its solubility in water. Such materials may be applied together with the condensation product of the invention or they may be applied as a separate step, but their application should normally precede the baking treatment where such is used.

Suitable cross-linking agents include aldehydes and dialdehydes such as formaldehyde, acrolein and glyoxal, capable of cross-linking reactions; and cyanuric halides and dihalogenotriazine derivatives. Resin precondensates include the initial stage condensation products of formaldehyde with nitrogen compounds such as urea, thiourea, dicyandiamide, amides, amines, carbamates, aminotriazines, urons, ureins, ureides, imidazolidones, pyridones and triazones, especially the methylol derivatives of such compounds and the lower alkyl ethers of such methylol derivatives; the methylol derivatives of nitrogen-containing polymers such as water-soluble urea/formaldehyde polycondensates, polyacrylamide and addition copolymers containing acrylamide and the lower alkyl ethers of such methylol derivatives; and polyacetals such as the acetal condensation products of aldehydes such as formaldehyde, acetaldehyde, glyoxal, malondialdehyde, succindialdehyde, adipaldehyde, hydroxyadipaldehyde and terephthaldehyde with alcohols such as ethylene glycol, diethylene glycol, glycerol, pentaerythritol and dipentaerythritol, especially polyacetals of the type described in U.S. patent specifications 2,785,947; 2,785,948; 2,785,949; 2,785,995; 2,785,996 and 2,786,081.

If a catalyst is used it should be chosen so as to promote the reaction of the resin precondensate with itself or of the resin precondensate or cross-linking agent with the condensation product of the invention or with the shaped article or with both. The catalyst may, for example, be an acid or an alkaline catalyst. In the case of resin precondensates, weakly acid substances or substances which liberate acid on heating are particularly suitable. As examples of such substances there may be mentioned, amongst others, organic acids such as oxalic acid; salts of weak bases and strong acids such as zinc chloride, the mineral acid salts of organic amines and especially ammonium salts such as ammonium sulphate and ammonium chloride; and substantially neutral substances which develop acidity on heating such as magnesium chloride and ammonium thiocyanate. Mixtures of such catalysts may be used if desired.

There may also be applied to the shaped article in conjunction with the condensation products of the invention other compounds which may serve to modify or enhance the effect achieved by the condensation product alone. Such compounds include, for example, hydroxyalkyl ethers of cellulose or starch.

There may also be applied to the shaped article in conjunction with the condensation products of the invention antioxidants or stabilisers which serve to prevent decomposition of the condensation products, especially where the process includes a high temperature baking treatment.

After the application of the condensation product to the shaped article and, if desired, the baking treatment, the shaped article may be rinsed in water and, if desired, washed in a hot solution of a detergent which may also contain an alkali, such as soda ash, to neutralise any residual acidic catalyst. Finally, the shaped article may be rinsed with water and dried.

Where the shaped article is a textile material the process of the invention may be applied before, in conjunction with, or after other chemical or mechanical finishing operations such as those used to confer resistance to shrinkage and creasing, modification of handle or surface lustre, water-repellency and optical brightness.

Shaped articles treated according to the present process are altered very little in appearance and retain their desirable characteristics. Textile materials composed of hydrophobic polymeric material retain their inherent characteristics, such as resistance to creasing or crushing, but usually they feel fuller and warmer to the touch. Their moisture absorbency is improved as a result of the treatment and their tendency to become electrified and to soil is diminished. These desirable properties are not easily destroyed by repeated washing and cleaning operations.

The invention is illustrated but not limited by the following examples in which the parts and percentages are by weight.

Example 1

35 parts of a polyoxyethylene glycol having a molecular weight of 1540, 15 parts of the salt of adipic acid and hexamethylene diamine, 3.3 parts of adipic acid and 50 parts of o-hydroxydiphenyl were stirred together at 259° C. under a stream of oxygen-free nitrogen for 3 hours. The pressure was reduced to 20 mm. over half an hour, during which time the bulk of the o-hydroxydiphenyl distilled over. The condensate was heated for 1 hour at 259° C./20 mm. and finally for 1½ hours at 259° C./0.1 mm. The solid, somewhat brittle product was gravel-milled with 50% aqueous isopropanol for 24 hours whereupon a viscous creamy dispersion containing 20% of solids was obtained.

A piece of a polyamide continuous filament fabric was impregnated with an aqueous solution obtained by adding 8 parts of the above dispersion to 92 parts of water. The fabric was then squeezed so as to retain 50% of its dry weight of liquor, dried for 1 minute at 120° C. and baked for 1 minute at 160° C.

The resulting fabric, compared to an untreated control fabric, had a reduced tendency to acquire charges of static electricity and possessed improved moisture absorbency.

Example 2

A piece of a polyamide continuous filament fabric was impregnated with an aqueous solution obtained by adding 8 parts of the dispersion of Example 1, 0.4 part of a urea/formaldehyde condensate prepared as described in Example 2 of British patent specification No. 953,754 and 0.2 part of ammonium chloride to 91.4 parts of water. The fabric was then squeezed so as to retain 50% of its dry weight of liquor, dried for 1 minute at 120° C. and baked for 1 minute at 160° C.

The resulting fabric, compared to an untreated control fabric, possessed a much reduced tendency to acquire charges of static electricity and improved moisture absorbency. These effects were maintained after repeated washing.

Example 3

25 parts of a polyoxyethylene glycol having a molecular weight of 1540, 25 parts of the salt of adipic acid and hexamethylene diamine, 2.4 parts of adipic acid and 50 parts of o-hydroxydiphenyl were condensed using precisely the same procedure as in Example 1. The brittle, pale yellow, polymer was gravel-milled with 50% aqueous isopropanol for 24 hours, giving a smooth creamy dispersion containing 14.5% of solids.

A piece of a polyamide continuous filament fabric was impregnated with an aqueous solution obtained by adding 11 parts of the above dispersion, 0.4 part of a urea/formaldehyde condensate prepared as described in Example 2 of British patent specification No. 953,754 and 0.2 part of ammonium chloride to 88.4 parts of water. The fabric was then squeezed so as to retain 50% of its dry weight of liquor, dried for 1 minute at 120° C. and baked for 1 minute at 160° C.

The resulting fabric, compared to an untreated control fabric, possessed a reduced tendency to acquire charges of static electricity and improved moisture absorbency. These effects were maintained after repeated washing.

Example 4

25 parts of a polyoxyethylene glycol having a molecular weight of 1540, 2.4 parts of adipic acid and 25 parts of caprolactam were stirred together at 259° C. in an atmosphere of oxygen-free nitrogen for 4 hours. The pressure was reduced to 15 mm. over half an hour and the mixture was heated at 259° C./15 mm. for one hour. During this time 7.8 parts of unreacted caprolactam distilled over. The solid, somewhat brittle, polymer was gravel-milled with water for 24 hours to give a viscous creamy dispersion containing 20% of solids.

A piece of a polyamide continuous filament fabric was impregnated with an aqueous solution obtained by adding 8 parts of the above dispersion, 0.4 part of a urea/formaldehyde condensate prepared as described in Example 2 of British patent specification No. 953,754 and 0.2 part of ammonium chloride to 91.4 parts of water. The fabric was then squeezed so as to retain 50% of its dry weight of liquor, dried for 1 minute at 120° C. and baked for 1 minute at 160° C.

The resulting fabric, compared to an untreated control fabric, possessed a much reduced tendency to acquire charges of static electricity and improved moisture absorbency. These effects were maintained after repeated washing.

Example 5

25 parts of a polyoxyethylene glycol having a molecular weight of 1540, 2.4 parts of adipic acid and 35 parts of caprolactam were condensed using precisely the same procedure as in Example 4. The weight of unreacted caprolactam which distilled over amounted to 9.4 parts. The polymer was gravel-milled with water for 24 hours to give a smooth creamy dispersion containing 20% of solids.

A piece of a polyamide continuous filament fabric was impregnated with an aqueous solution obtained by adding 8 parts of the above dispersion, 0.4 part of a urea/formaldehyde condensate prepared as described in Example 2 of British patent specification No. 953,754 and 0.2 part of ammonium chloride to 91.4 parts of water. The fabric was then squeezed so as to retain 50% of its dry weight of liquor, dried for 1 minute at 120° C. and baked for 1 minute at 160° C.

The resulting fabric, compared to an untreated control fabric, possessed a much reduced tendency to acquire charges of static electricity and improved moisture absorbency. These effects were maintained after repeated washing.

Example 6

25 parts of a condensate of glycerol with 34 moles of ethylene oxide, 3.4 parts of adipic acid, 25 parts of caprolactam and 4 parts of water were heated in a Carius tube at 200–210° C. for 3 hours. The product was further heated for 4 hours at 259° C. in a stream of oxygen-free nitrogen and for ½ hour at 259° C./15 mm. The molten polymer was clear and extremely viscous, and set to a tough, rubbery, translucent solid on cooling.

Example 7

25 parts of a polyoxyethylene glycol having a molecular weight of 600, 6.1 parts of adipic acid and 25 parts of caprolactam were condensed using precisely the same procedure as that described in Example 4. The weight of unreacted caprolactam which distilled over amounted to 5 parts. The molten polymer was extruded directly into 200 parts of cold water. The mixture was gravel-milled for eighteen hours to give a smooth creamy dispersion containing 22% of solids.

A piece of a polyamide continuous filament fabric was impregnated with an aqueous composition obtained by adding 15.2 parts of the above dispersion and 0.8 part of a 20% aqueous non-ionic dispersion of the antioxidant bis - (2 - hydroxy - 3 - (α - methylcyclohexyl) - 5 - methylphenyl) methane, to 84 parts of water. The fabric was then squeezed so as to retain 30% of its dry weight of liquor, dried for 1 minute at 120° C. and baked for 30 seconds at 200° C.

The resulting fabric, compared to an untreated control fabric, possessed a greatly reduced tendency to acquire charges of static electricity, improved moisture absorbency and a reduced tendency to soil.

Example 8

25 parts of a polyoxyethylene glycol having a molecular weight of 4000, 0.9 part of adipic acid, and 35 parts of caprolactam were condensed using precisely the same procedure as that described in Example 4. The weight of unreacted caprolactam which distilled over amounted to 17.4 parts. The molten polymer was extruded directly into 200 parts of cold water, and was dispersed therein by gravel-milling for 18 hours. The dispersion contained 11.4% of solids.

A piece of a polyamide continuous filament fabric was impregnated with an aqueous composition obtained by adding 29.0 parts of the above dispersion, 0.8 part of a 20% aqueous non-ionic dispersion of the antioxidant bis-(2 - hydroxy - 3 - (α - methylcyclohexyl) - 5 - methylphenyl) methane, 0.8 part of a methylated urea/formaldehyde condensate prepared as described in Example 8 of British patent specification No. 953,754 and 0.4 part of ammonium chloride to 69 parts of water. The fabric was then squeezed so as to retain 30% of its dry weight of liquor and was dried for 1 minute at 140° C.

The resulting fabric, compared to an untreated control fabric, possessed a much reduced tendency to acquire charges of static electricity and improved moisture absorbency. These effects were maintained after washing.

Example 9

42 parts of a polyoxyethylene glycol having a molecular weight of 1540, 4.0 parts of adipic acid, 18 parts of caprolactam and 2.9 parts of water were heated in a sealed autoclave for 3 hours at 200–210° C., then at atmospheric pressure in an atmosphere of oxygen-free nitrogen for 5 hours at 259° C., and finally for 1 hour at 259° C./15 mm. The resulting polymer had a nitrogen content of 2.6% and hence contained 21.0% by weight of polymerised caprolactam. An aqueous dispersion was prepared by gravel-milling, containing 14.0% solids.

A piece of a polyamide continuous filament fabric was impregnated with an aqueous composition obtained by adding 24.0 parts of the above dispersion, 0.8 part of a 20% aqueous non-ionic dispersion of the antioxidant bis-(2 - hydroxy - 3 - (α-methylcyclohexyl)-5-methylphenyl) methane, 0.7 part of a methylated urea/formaldehyde condensate prepared as described in Example 8 of British patent specification No. 953,754 and 0.3 part of ammonium chloride to 74.2 parts of water. The fabric was then squeezed so as to retain 30% of its dry weight of liquor and was dried for 1 minute at 140° C.

The resulting fabric, compared to an untreated control fabric, possessed a much reduced tendency to acquire charges of static electricity, improved moisture absorbency and a reduced tendency to soil. These effects were substantially maintained on washing.

Example 10

25 parts of a polyoxyethylene glycol having a molecular weight of 1540, 2.4 parts of adipic acid, 6.5 parts of caprolactam, 9.0 parts of the salt of hexamethylene diamine and adipic acid and 9.5 parts of the salt of hexamethylene diamine and sebacic acid were condensed using the same procedure as that described in Example 4. One part of unreacted caprolactam distilled over during the reduced pressure stage. The molten polymer was extruded into 300 parts of cold water and was dispersed therein by high speed agitation folowed by gravel-milling. The dispersion contained 11.5% of solids.

A piece of a polyamide continuous filament fabric was impregnated with an aqueous composition obtained by adding 29.0 parts of the above dispersion, 0.8 part of a 20% aqueous nonionic dispersion of the antioxidant bis-(2 - hydroxy - 3 - (α-methylcyclohexyl)-5-methylphenyl) methane, 0.7 part of a methylated urea/formaldehyde condensate prepared as described in Example 8 of British patent specification No. 953,754 and 0.3 part of ammonium chloride to 69.2 parts of water. The fabric was then squeezed so as to retain 30% of its dry weight of liquor and was dried for 1 minute at 140° C.

The resulting fabric, compared to an untreated control fabric, possessed a much reduced tendency to acquire charges of static electricity, improved moisture absorbency, and a reduced tendency to soil, both before and after laundering.

Example 11

A piece of a polyacrylonitrile fabric was impregnated with an aqueous composition obtained by adding 25 parts of the aqueous polycondensate dispersion made as described in Example 4 and 0.8 part of a 20% aqueous non-ionic dispersion of the antioxidant bis-(2-hydroxy-3-(α-methylcyclohexyl) - 5 - methylphenyl) methane, to 74.8 parts of water. The fabric was squeezed until the amount of liquor which it retained was 40% of its dry weight. It was dried at 110° C. for 1 minute and then heated at 140° C. for 3 minutes.

The resulting fabric, compared to an untreated control fabric, possessed a reduced tendency to acquire electrostatic charges and to be soiled by greasy soil.

Example 12

A piece of a polyester fabric was impregnated with an aqueous composition obtained by adding 20 parts of the aqueous polycondensate dispersion made as described in Example 4, 0.8 part of a methylated urea-formaldehyde precondensate prepared as described in Example 8 of British patent specification No. 953,754 and 0.4 part of ammonium chloride to 88.8 parts of water. The fabric was squeezed until the amount of liquor which it retained was 25% of its dry weight and was then heated at 145° C. for 1 minute.

The resulting fabric, compared to an untreated fabric, possessed a much reduced tendency to acquire charges of static electricity, improved moisture absorbency and enhanced resistance to soiling, both before and after washing.

Example 13

A cotton fabric was impregnated with an aqueous composition obtained by adding 8 parts of dimethylol ethylene urea, 6 parts of the aqueous polycondensate dispersion made as described in Example 4 and 0.8 part of the acid catalyst zinc nitrate hexahydrate to 85.2 parts of water. The fabric was squeezed so as to retain 50% of its dry weight of liquor, dried at 120° C. for 1 minute and then heated at 150° C. for 3 minutes. It was after-washed in a solution containing 0.1% of a non-ionic detergent for 5 minutes at 50° C.

The resulting crease-resistant fabric possessed superior high speed stitchability properties and improved abrasion resistance to cotton treated with dimethylol ethylene urea and acid catalyst in the absence of the polycondensate.

Example 14

A piece of a cellulose triacetate fabric was impregnated with an aqueous composition obtained by adding 30 parts of the aqueous polycondensate dispersion made as described in Example 4 and 0.5 part of the antioxidant bis-(2 - hydroxy - 3 - ($\alpha$-methylcyclohexyl)-5-methylphenyl) methane to 69.5 parts of water. The fabric was squeezed until the amount of liquor which it retained was 50% of its dry weight. It was dried at 110° C. for 1 minute followed by heating at 180° C. for 30 seconds.

The resulting fabric, compared to an untreated control, possessed a fuller handle, a reduced tendency to acquire charges of static electricity and superior resistance to soiling.

Example 15

50 parts of a molten copolymer prepared as described in Example 6 were drowned out into 300 parts of cold water and were dispersed therein by high speed agitation for 1 hour followed by gravel-milling for 36 hours.

A piece of a polyamide continuous filament fabric was impregnated with an equeous solution obtained by adding 37.0 parts of the above dispersion, 0.7 part of a methylated urea/formaldehyde condensate prepared as described in Example 8 of British patent specification No. 953,754, 0.8 part of a 20.0% non-ionic dispersion of the antioxidant bis-(2-hydroxy - 3 - ($\alpha$ - methylcyclohexyl)-5-methylphenyl) methane and 0.35 part of ammonium chloride to 61 parts of water. The fabric was then squeezed so as to retain 30% of its dry weight of liquor and dried for 1 minute at 140° C. The resulting fabric, compared to an untreated control fabric, possessed a much reduced tendency to acquire charges of static electricity and improved moisture absorbency, both before and after washing.

Example 16

25 parts of a condensate of glycerol with 34 moles of ethylene oxide, 2.3 parts of adipic acid, 25 parts of caprolactam and 4 parts of water were reacted under exactly the same conditions as those described in Example 6. The molten copolymer was drowned out into 300 parts of water and was dispersed therein by high speed agitation for 1 hour followed by gravel-milling for 24 hours.

A piece of a polyamide continuous filament fabric was impregnated with an aqueous solution obtained by adding 31.0 parts of the above dispersion, 0.7 part of a methylated urea/formaldehyde condensate prepared as described in Example 8 of British patent specification No. 953,754, 0.8 part of a 20.0% non-ionic dispersion of the antioxidant bis-(2-hydroxy-3-($\alpha$-methylcyclohexyl)-5-methylphenyl) methane and 0.35 part of ammonium chloride to 67 parts of water. The fabric was then squeezed so as to retain 30% of its dry weight of liquor, and dried for 1 minute at 140° C. The resulting fabric, compared to an untreated control fabric, possessed a greatly reduced tendency to acquire charges of static electricity and improved moisture absorbency. These effects were maintained after washing.

Example 17

30 parts of a condensate of octadecylamine with 20 moles of ethylene oxide, 3.9 parts of adipic acid, and 30 parts of caprolactam were stirred together at 259° C. under a stream of oxygen-free nitrogen for 4 hours and were then heated for 40 minutes at 259° C./15 mm. pressure. The viscous homogeneous melt was drowned out into 300 parts of cold water and was dispersed therein by high speed agitation for 1 hour followed by gravel-milling for 20 hours.

A piece of a polyamide continuous filament fabric was impregnated with an aqueous solution obtained by adding 26.0 parts of the above dispersion, and 0.8 part of a 20.0% non-ionic dispersion of the antioxidant bis-(2-hydroxy-3-($\alpha$-methylcyclohexyl) - 5 - methylphenyl)-methane to 73 parts of water. The fabric was then squeezed so as to retain 30% of its dry weight of liquor, dried at 120° C. for 1 minute and baked at 200° C. for 30 seconds. The resulting fabric, compared to an untreated control fabric, possessed a greatly reduced tendency to acquire charges of static electricity and improved moisture absorbency.

We claim:
1. Process for the treatment of a textile composed of hydrophobic synthetic polymeric material, which comprises applying to said textile an aqueous dispersion of a condensation product of (1) an aliphatic dicarboxylic acid with (2) a mixture of (a) a polyoxyethylene glycol having a molecular weight of at least 300 and (b) an amine component selected from the class consisting of aliphatic and cycloaliphatic amino acids, the lactams derived from said amino acids, aliphatic and cycloaliphatic diamines, mixtures of at least one of said amino acids and said diamines and mixtures of at least one of said lactams and said diamines, the amount of the aliphatic dicarboxylic acid incorporated in the condensation products being the approximate stoichiometric equivalent of the sum of the amounts of the polyoxyethyleneglycol and of the amine component and the relative amounts of the polyoxyethylene glycol and the amine component being such that the condensation products contain at least one amide group for every group present, and thereafter heating the textile at a temperature in the range 120° C. to 220° C. for a period of time of from 10 seconds to 30 minutes.

2. A process as claimed in claim 1, wherein the aliphatic dicarboxylic acid of the condensation product is adipic acid.

3. A process as claimed in claim 1 wherein the aliphatic lactam of the condensation product is caprolactam.

4. A process as claimed in claim 1 wherein the aliphatic diamine of the condensation product is hexamethylene diamine.

5. A process as claimed in claim 1, wherein the hydrophobic synthetic polymeric material is a polyamide.

6. A process as claimed in claim 1, wherein the amount of the condensation product which is applied to the textile lies within the range 0.1% to 5% of the weight of the textile.

7. A process as claimed in claim 1, wherein there is applied to the textile, in addition to the condensation product, a resin precondensate in an amount of up to 50% of the weight of the condensation product and a catalyst for the said precondensate in an amount of up to 25% of the weight of the precondensate.

8. A process as claimed in claim 1, wherein there is applied to the textile, in conjunction with the condensation product, an antioxidant in an amount of up to 20% of the weight of the condensation product.

References Cited

UNITED STATES PATENTS

| | | | |
|---|---|---|---|
| 2,417,513 | 3/1947 | Nelles et al. | 117—139.5 |
| 2,475,034 | 7/1947 | Lasher | 260—75 |
| 3,086,961 | 4/1963 | House et al. | 260—75 |

WILLIAM D. MARTIN, Primary Examiner

THEODORE G. DAVIS, Assistant Examiner

U.S. Cl. X.R.

117—141, 143, 145